(12) United States Patent
Leveen et al.

(10) Patent No.: US 9,771,964 B2
(45) Date of Patent: Sep. 26, 2017

(54) FASTENING DEVICE, FASTENING SYSTEM AND FURNITURE ASSEMBLY

(71) Applicant: INTER IKEA SYSTEMS B.V., Delft (NL)

(72) Inventors: Jim Leveen, Lund (SE); Anders Eriksson, Virestad (SE); Goran Sjostedt, Lonsboda (SE)

(73) Assignee: INTER IKEA SYSTEMS B.V., Delft (NL)

( * ) Notice: Subject to any disclaimer, the term of this patent is extended or adjusted under 35 U.S.C. 154(b) by 199 days.

(21) Appl. No.: 14/440,725

(22) PCT Filed: Mar. 6, 2013

(86) PCT No.: PCT/EP2013/054518
§ 371 (c)(1),
(2) Date: May 5, 2015

(87) PCT Pub. No.: WO2014/072080
PCT Pub. Date: May 15, 2014

(65) Prior Publication Data
US 2015/0300393 A1    Oct. 22, 2015

(30) Foreign Application Priority Data

Nov. 6, 2012  (SE) ........................... 1251255

(51) Int. Cl.
*F16B 19/10*  (2006.01)
*F16B 12/24*  (2006.01)
(Continued)

(52) U.S. Cl.
CPC .............. *F16B 19/00* (2013.01); *F16B 12/10* (2013.01); *F16B 12/24* (2013.01); *F16B 19/1081* (2013.01); *F16B 2012/103* (2013.01)

(58) Field of Classification Search
CPC .. F16B 19/1081; F16B 12/24; A47B 47/0008; A47B 47/0025; A47B 47/0033
(Continued)

(56) References Cited

U.S. PATENT DOCUMENTS 2,100,873 A * 11/1937 Roberts .................. F16B 19/02
403/297
2,120,577 A *  6/1938 Schulte ............... F16B 13/0858
411/71
(Continued)

FOREIGN PATENT DOCUMENTS

CN    201155509 Y    11/2008
CN    101915253 A    12/2010
(Continued)

OTHER PUBLICATIONS

English translation of Office Action issued in Chinese Application No. 201380057903.7, mailed May 3, 2016.
(Continued)

*Primary Examiner* — Flemming Saether
(74) *Attorney, Agent, or Firm* — Merchant & Gould P.C.

(57) ABSTRACT

A fastening device (2;20) for assembling panels (170;180) in furniture, the device (2;20) having an axial extension along an axial direction and a lateral extension along a lateral direction, said device (2;20) comprising an upper part (4;40), and a lower part (5;50) a circumferential extending peripheral surface (10;110), the device (2;20) having an axially extending through passage (8;80) for the insertion of a pin the in the axial direction, wherein the fastening device (2;20) comprises elements for taking up forces along both the axial and lateral direction.

13 Claims, 12 Drawing Sheets

(51) Int. Cl.
*F16B 19/00* (2006.01)
*F16B 12/10* (2006.01)

(58) Field of Classification Search
USPC ............... 411/45–48, 58, 71; 403/DIG. 13
See application file for complete search history.

(56) References Cited

U.S. PATENT DOCUMENTS

| | | | | |
|---|---|---|---|---|
| 2,616,328 | A * | 11/1952 | Kingsmore | F16B 19/1081 411/80.2 |
| 4,481,702 | A * | 11/1984 | Mitchell | F16B 13/066 29/432 |
| 4,871,289 | A * | 10/1989 | Choiniere | E04D 3/3603 411/41 |
| 4,874,276 | A * | 10/1989 | Iguchi | F16B 19/1081 24/297 |
| 5,290,137 | A * | 3/1994 | Duffy, Jr. | F16B 19/1081 411/41 |
| 5,775,860 | A * | 7/1998 | Meyer | F16B 19/1081 411/41 |
| 6,364,586 | B1 * | 4/2002 | Okada | F16B 19/1081 411/41 |
| 6,406,235 | B1 | 6/2002 | Bantle | |
| 7,147,419 | B2 * | 12/2006 | Balbo Di Vinadio | E05D 5/023 411/182 |
| 7,553,116 | B2 * | 6/2009 | Lesecq | F16B 19/1081 411/41 |
| 7,862,272 | B2 * | 1/2011 | Nakajima | F16B 19/1081 411/41 |
| 8,221,479 | B2 * | 7/2012 | Glazer | A61B 17/686 411/58 |

FOREIGN PATENT DOCUMENTS

| | | |
|---|---|---|
| CN | 201683325 U | 12/2010 |
| DE | 19962955 A1 | 7/2001 |
| DE | 199 62 955 | 7/2011 |
| EP | 0 611 002 | 8/1994 |
| EP | 1 041 297 | 10/2000 |
| EP | 1041297 A2 | 10/2000 |
| EP | 2 446 777 | 5/2012 |
| EP | 2446777 A1 | 5/2012 |
| SU | 1225935 A1 | 4/1986 |
| WO | WO 97/16090 | 5/1997 |

OTHER PUBLICATIONS

International Search Report for International Application No. PCT/EP2013/054518 mailed Jul. 2, 2013 (2 pages).
English translation of Office Action issued in Chinese Application No. 201380057903.7, mailed Dec. 16, 2016.
Office Action issued in Russian Application No. 2015117537, mailed Jan. 30, 2017.

* cited by examiner

FASTENING DEVICE, FASTENING SYSTEM AND FURNITURE ASSEMBLY

This application is a National Stage Application of PCT/EP2013/054518, filed 6 Mar. 2013, which claims benefit of Serial No. 1251225-4, filed 6 Nov. 2012 in Sweden and which applications are incorporated herein by reference. To the extent appropriate, a claim of priority is made to each of the above disclosed applications.

FIELD OF THE INVENTION

The present invention relates to a fastening device for detachably assembling panels in furniture. The invention also relates to a fastening system and a furniture assembly including the fastening device.

The fastening device is for detachably assembling panels in furniture having an axial extension along a axial direction and a lateral extension along a lateral direction, a circumferential extending peripheral surface, the device comprising an upper part exhibiting a wider portion and a more narrow portion, and a lower part the device having an axially extending through passage for the detachable insertion of a pin the in the axial direction.

BACKGROUND

The invention aims to improve how panels are assembled in furniture. The manner this is done presently, when assembling for instance back panels in furniture, is by nailing the back panel to the other part of the furniture. Currently, this is done by the end customer using a hammer and nails. This has several disadvantages, such as requiring substantial effort by the customer, hazards of destroying the back of the furniture by misplacing or destroying the nails. Furthermore, the furniture thus assembled cannot be disassembled and re-assembled.

SUMMARY

An object of the invention is to provide for a fastening device that comprises elements for taking up forces along both axial and lateral directions.

The fastening device has an axial extension along an axial direction and a lateral extension along a lateral direction, the device comprising an upper part, and a lower part a circumferential extending peripheral surface, the device having an axially extending through passage for the insertion of a pin the in the axial direction.

According to another embodiment of the invention, the device comprises protrusions arranged on the peripheral surface thereof.

According to yet another embodiment of the invention, the protrusions have a pyramidal shape.

According to a further embodiment of the invention, the fastening device has an upper part having a wider and narrower section, the more narrow section comprising vertical grooves.

According to a further embodiment of the invention, the protrusions are arranged to extend in the axial direction and also in a direction transversal thereto of the fastening device.

According to a further embodiment of the invention, the peripheral surface comprises a first outer surface and a second outer surface both having protrusions arranged thereon.

According to a further embodiment of the invention, the protrusions have an extension from the peripheral surface of about 0.1-3 mm.

According to a further embodiment of the invention the axially extending through passage has an inner surface, said inner surface being provided with an inner circumferential recess provided in the upper part of the fastening device.

According to a further embodiment of the invention, the upper part comprises a top surface and the lower part comprises a bottom surface, wherein the fastening device comprises a first slit arranged in the axial direction extending from the upper part of the fastening device and a second slit extending in the axial direction in the lower part of the fastening device.

According to a further embodiment of the invention, the fastening device comprises a first slit s arranged from the top surface of the upper part, extending in the axial direction.

According to a further embodiment of the invention, the second slit is arranged from the bottom surface of the lower part extending in the axial direction.

According to a further embodiment of the invention a further slit is arranged in from the top surface of the upper part, extending in the axial direction.

According to a further embodiment of the invention a further slit is arranged in from the bottom surface of the lower part, extending in the axial direction.

According to a further embodiment of the invention the slits arranged in the upper part also extends into the lower part and that the slits arranged in the lower part also extends into the upper part.

According to a further embodiment of the invention there is provided for a fastening system comprising a fastening device, and a locking device for insertion into the through passage of the fastening device.

According to a further embodiment of the invention there is provided for a furniture assembly comprising a fastening system comprising a first joining member having a hole and a second joining member having a hole, wherein the dowel is inserted into the hole in the first joining member via the through passage in the second furniture member.

According to a further embodiment of the invention there is provided for a furniture assembly comprising a fastening system and a first joining member and a second joining member wherein the first joining member comprises a recess for insertion of the second member and a hole for insertion of the fastening device.

BRIEF DESCRIPTION OF DRAWINGS

Embodiments of the present invention will now be described with reference to the appended drawings.

DETAILED DESCRIPTION

Figure 1:
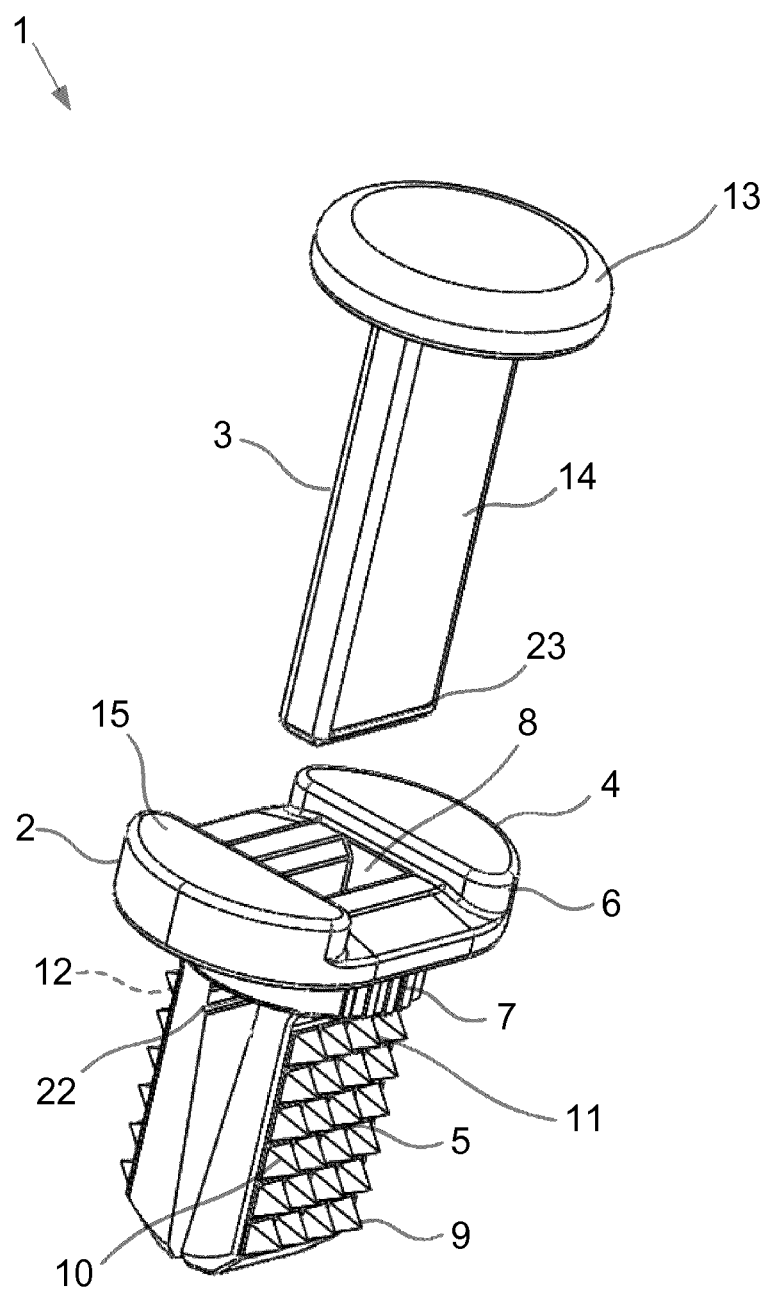
FIG. 1 shows a perspective view of a fastening system according to an embodiment of the invention, in a pre-assembled state.

A fastening system 1 as seen in FIG. 1 is for assembling furniture parts into a furniture assembly, and in the end product an entire assembled piece of furniture. The fastening system 1 as shown in the embodiment in FIG. 1 comprises a fastening device 2 in the form of a dowel and a locking device 3 in the form of a pin. The dowel 2 exhibits an elongated form with an axial extension, having an upper part 4 and a lower part 5. The upper part 4 exhibits a wider upper portion 6 and a narrower lower portion 7. The wider portion 6 is arranged to rest on a surface of a furniture part encompassing a hole in said furniture part. The underside of the wider upper portion 6 then abuts the surface of the furniture part encompassing said hole. The narrower lower portion 7 is dimensioned and shaped to fit, preferably snuggly, the hole in the furniture part, so as to keep the dowel 2 in the hole in a retained manner. The upper part 4 thus retains the dowel 2, to the surface of a furniture part when the dowel 2 is inserted in a hole with a narrower dimension than the wider portion 6. The hole could then also substantially correspond in shape and dimensions with the narrower lower portion 7 to receive and cooperate with the narrower lower portion 7, and thus the dowel 2, in a retaining manner. The dowel 2 is provided with an axially extending through passage 8 for insertion of the pin 3. In the embodiment as shown in FIG. 1 the through passage 8 runs through the entire body of the dowel 2. The dowel 2 exhibits protrusions 9 arranged on the circumferential peripheral surface 10 of the dowel 2. The lower part 5 comprises two tongues on opposite sides of the through passage created by the through passage 8 and the slits arranged in the circumferential peripheral surface 10. The tongues have a lateral and a central surface, respectively; the central surfaces of the respective tongue extend in planes that are angled with respect of each other. The peripheral surface 10 of the lower part 5 The peripheral surface 10 comprising a first outer surface 11 and a second outer surface 12, located on each tongue. The protrusions 9 serve the purpose of elements taking up forces in both the axial and the lateral direction. That is the elements or protrusions 9 will, when the pin 3 is inserted into the dowel 2 resist movement in the axial direction of the dowel 2 and in the sideways or lateral direction thereto. The protrusions 9 extend in the axial direction as well as in a transversal direction of the dowel 2 and cover both said first outer surface 11 and said second outer surface 12. In other words, the protrusions 9 are arranged over outer surface 11 and a second outer surface of the circumferential peripheral surface 10 in a matrix form. The protrusions 9 as shown in FIG. 1 have a pyramidal shape. This feature improves the uptake of axial and lateral forces of the protrusions 9. The protrusions according to the invention may exhibit other suitable shapes that serve the purpose of taking up forces coming from both the axial direction and a lateral, or sideways, direction.

The pin 3 exhibits a wider upper part 13 and a more narrow lower part 14. The wider upper part 13 may then be considered a pin head 13, while the narrower lower part 14 may be considered a pin stem. The pin 3 is intended to be inserted into the through passage 8 of the dowel 2, with its lower part 14 inserted into the through passage 8, with the lower surface of the upper part 13 resting on the top surface of the upper part 4 of the dowel 2.

Figure 2:
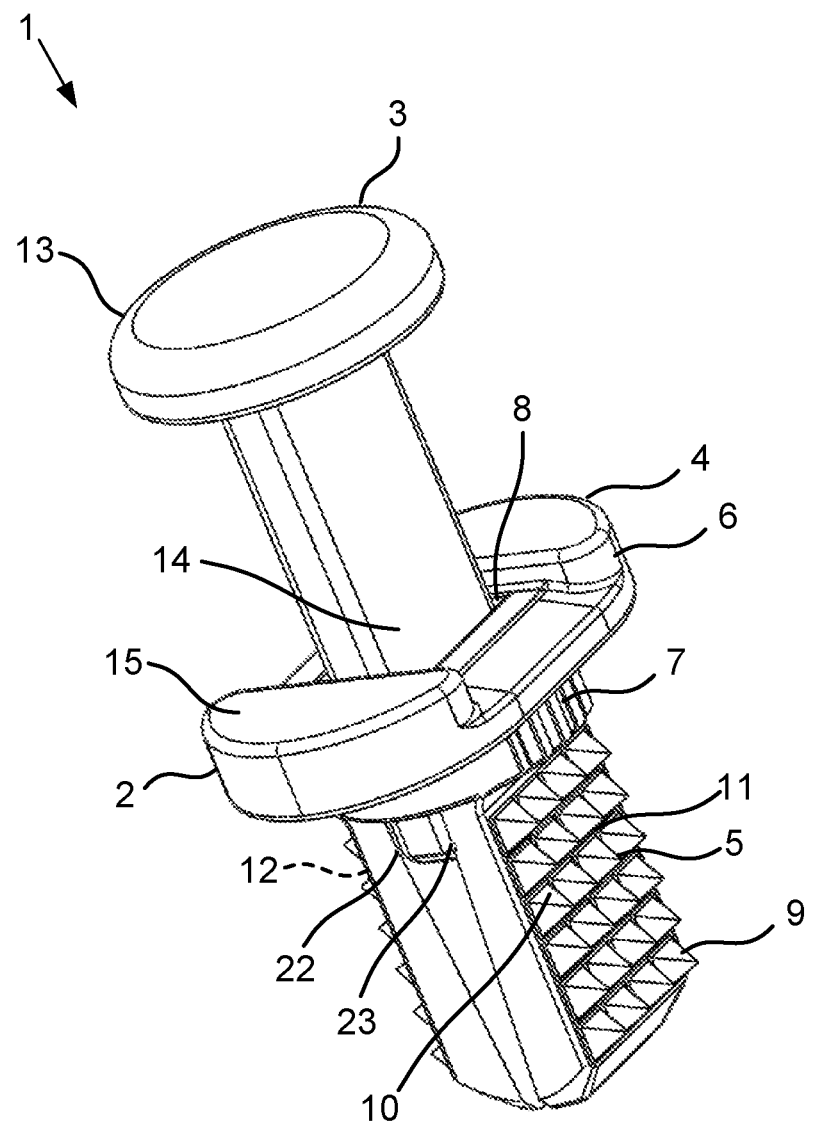
FIG. 2 shows a perspective view of a fastening system according to an embodiment of the invention, in a semi-assembled state.

FIG. 2 shows the fastening system 1 in a semi-assembled state, the pin 3 partially inserted into the through passage 8 of the dowel 2.

Figure 3:
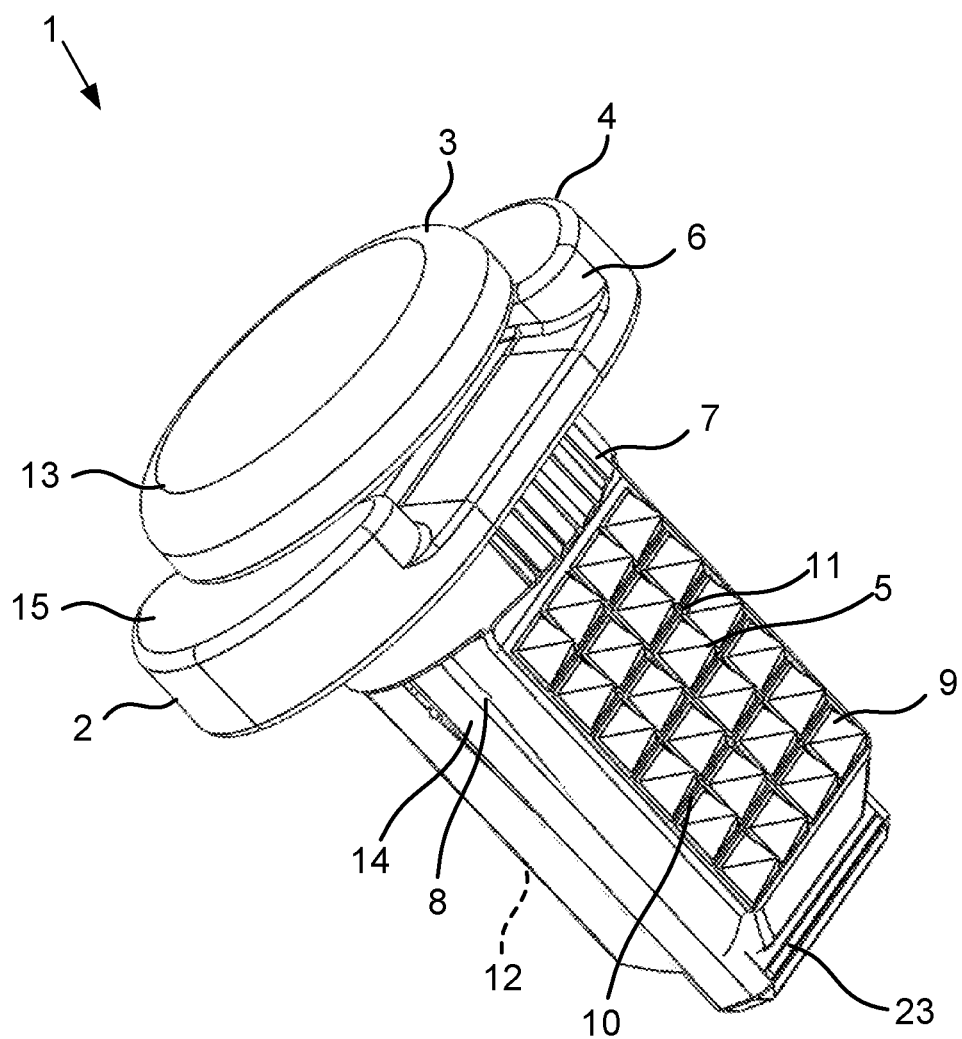
FIG. 3 shows a perspective view of a fastening system according to an embodiment of the invention, in an assembled state.

In FIG. 3 the fastening system 1 is in an assembled state, the pin 3 being fully inserted into the dowel 2, resting with the lower surface of the upper part 13 on the top surface 15 of the upper part 4 of the dowel 2. In this state the tongues of the lower part 5 of the dowel 2 have been urged laterally, such that the circumference of the lower part 5 is increased. In this way the dowel 2 may be secured to the furniture part.

Figure 4:
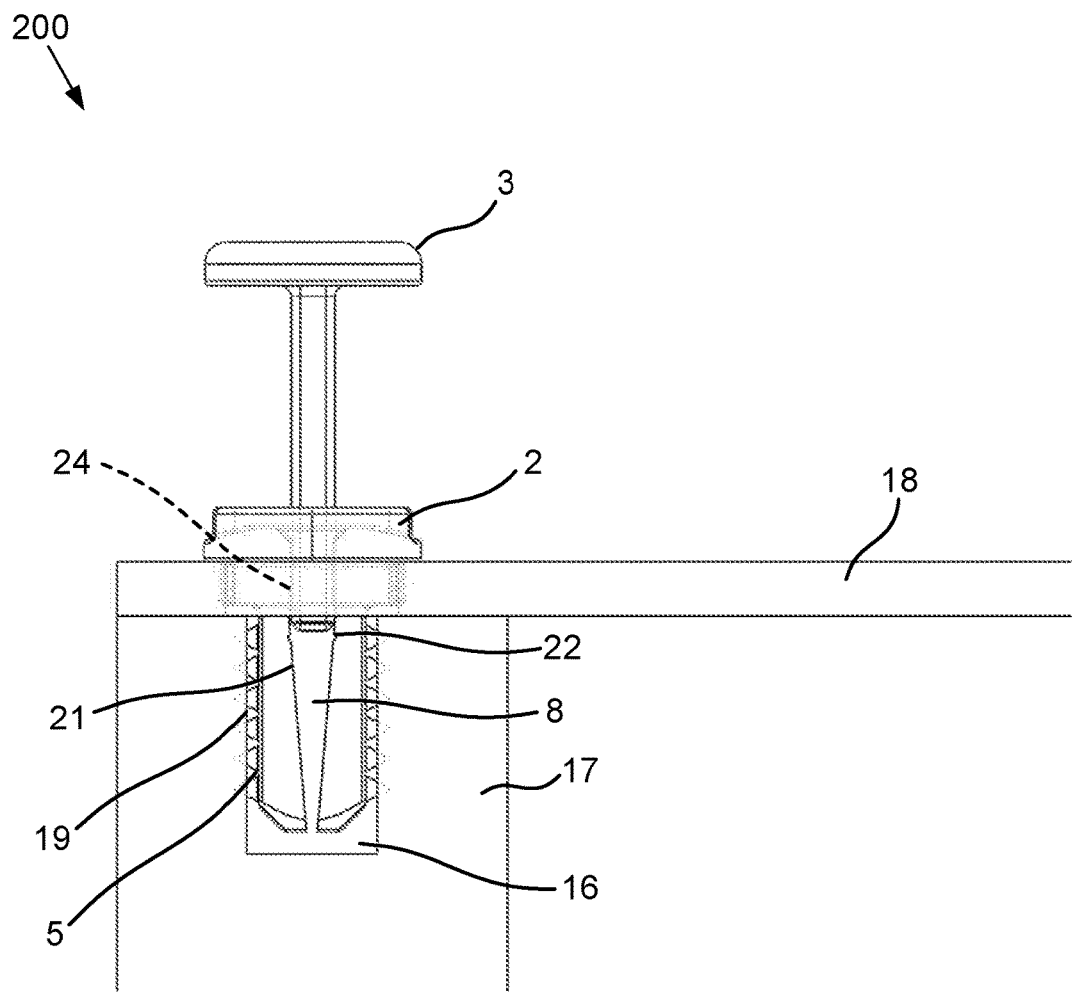
FIG. 4 shows a side view of the fastening system in FIG. 2.

FIG. 4 is a side view of the fastening system 1 shown in FIG. 2, when in semi-assembled state, the pin 3 being partially inserted into the through passage 8. The fastening system is partially assembled in a furniture assembly 200 comprising a first furniture member 17, a second furniture member 18, the dowel 2 and the pin 3. The lower part 5 of the dowel 2 is inserted into a predrilled hole 16 in the first furniture member 17, through a through passage in the second furniture member 18. When the pin 3 is fully inserted into the through passage 8 of the dowel 2, the dowel 2 will expand and the protrusions 9 will grip into the inner circumferential surface 19 of the first furniture member 17 surrounding the predrilled hole 16. The pin 3 is removably inserted into the through passage 8 of the dowel 2. When removed, the furniture members assembled will be disassembled and can be re-assembled again. As can be seen in FIG. 1-4 the dowel 2 exhibits an inner surface 21 provided with an inner circumferential recess 22 in the upper part 4 of the dowel 2. This recess 22 is for locking the pin 3 to the dowel 2 when it is inserted therein in a semi-assembled state as shown in FIG. 2. This is achieved by the pin 3 exhibiting a corresponding groove 23 arranged on the pin 3, that locks against the recess 22 thus locking the pin 3 to the dowel in a transport mode, making it easy for the end customer to find the two parts and to assembly them into the furniture. When the pin 3 is finally assembled as shown in FIG. 3, the pin 3 is fully inserted into the dowel 2 and the groove 23 will lock the pin 3 to the dowel 2 by hooking into the bottom part of the dowel 2.

Figure 5:
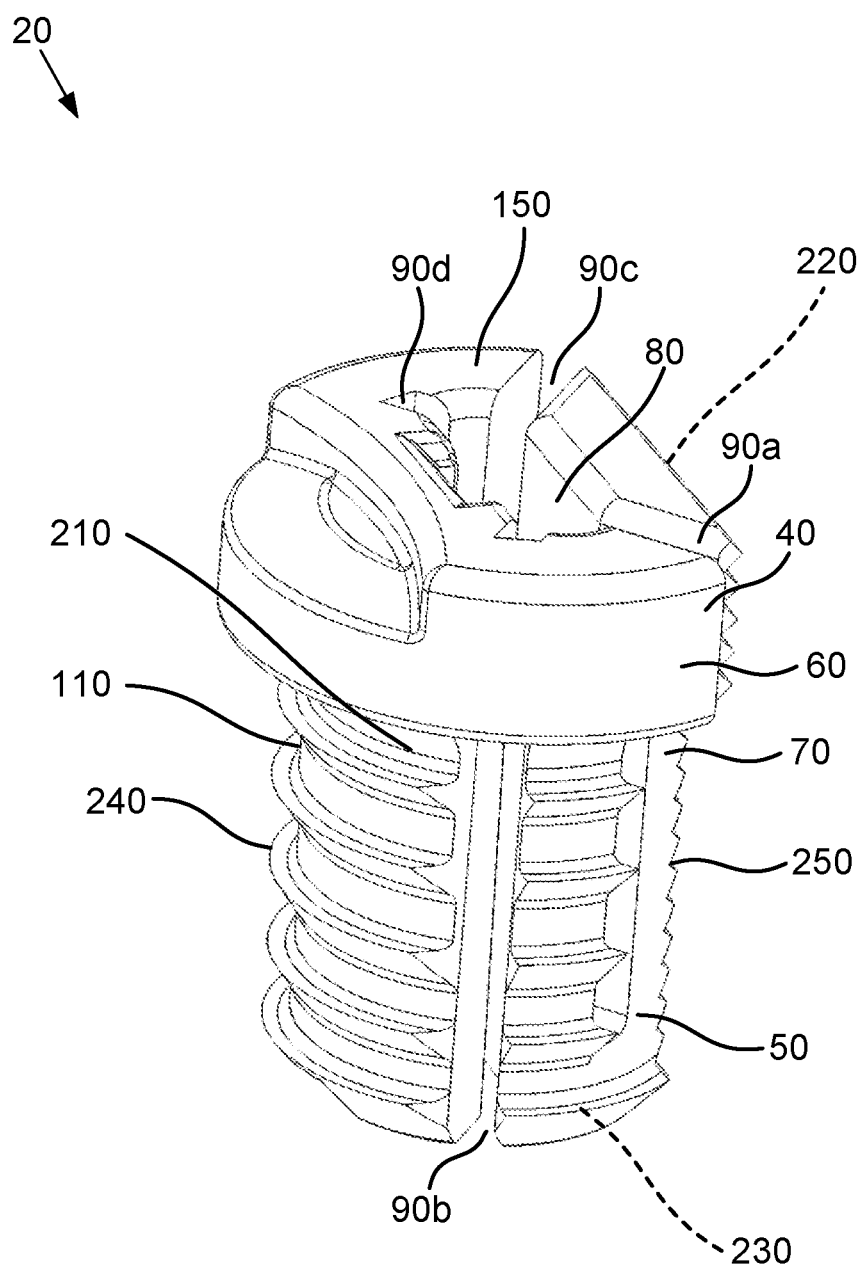
FIG. 5 shows a perspective view of a fastening device according to another embodiment of the invention.

The fastening device 20 seen in FIG. 5 shows an alternative way of performing the instant invention. The fastening device or dowel 20 exhibits an elongated form having an axial direction, further having an upper part 40 and a lower part 50. The upper part 40 exhibits a wider upper portion 60 and a narrower portion 70. The wider portion 60 is arranged to lock the upper part 40, and thus the dowel 20, to the surface of a furniture part when the dowel is inserted in a hole with a narrower dimension than the wider portion 60. The dowel 20 is provided with an axially extending through passage 80. In the embodiment as shown in FIG. 5 the through passage 80 runs through the entire body of the dowel 20. The dowel 20 comprises four axially extending slits. A first slit 90a extends from the top surface 150 of the upper part 40 of the dowel 20, a second slit 90b extends from the bottom surface of the lower part 50 of the dowel 20, a third slit 90c extends from the top surface of 150 of the upper part 40 of the dowel 20, and a fourth slit 90d extends from the bottom surface of the lower part 50 of the dowel 20. As can be seen in FIG. 5 the dowel 20 exhibits a general cylindrical cross-section seen from the top surface 150 of the upper part, with a segment of the cylindrical shape truncated. The circumferential peripheral surface 110 of the dowel 20 will thus comprise partly, a curved surface 210, and partly, a flat surface 220, extending in the axial direction from the top surface 150 of the upper part of the dowel 20 to the bottom surface 230 of the lower part 50 of the dowel 20. The curved surface is intended to fit in a bore hole of a first furniture part when assembled and the flat surface 220 is intended to fit and clamp against the flat surface of a second furniture part to assemble the two furniture parts together.

The dowel 20 comprises circumferential flanges 240 on the curved surface 210 of the circumferential peripheral surface 110. The flat surface 220 of the circumferential peripheral surface 110 exhibits circumferential grooves 250.

Figure 6:
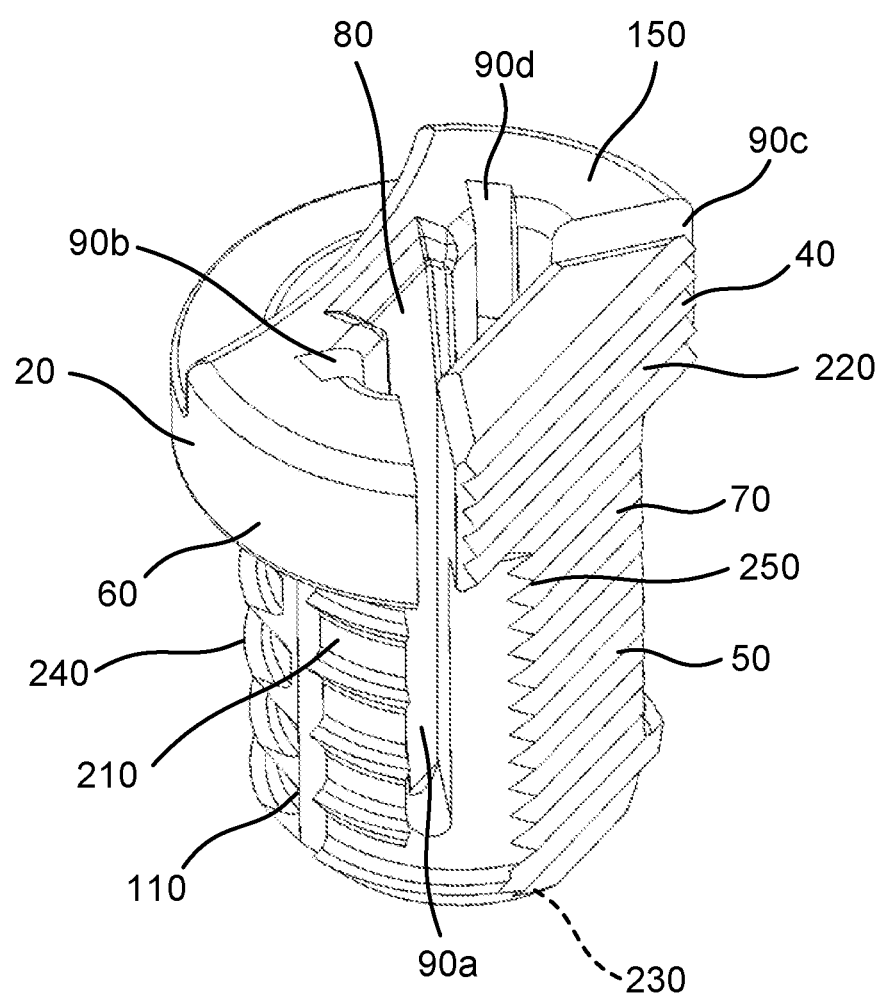
FIG. 6 shows another perspective view of the fastening device shown in FIG. 5.

FIG. 6 shows the dowel 20 from the side of the flat surface 220 of the circumferential peripheral surface 110 of the dowel 20. FIG. 6 shows that the grooves of the flat surface 220 of the circumferential peripheral surface 110 are of smaller dimension than the flanges 240 of the curved surface 210 of the circumferential surface 110. As can be seen in FIG. 6 there are a multitude of grooves 250 with ridges in between, and a multitude of flanges 240 with neck portions in between, arranged in the circumferential direction of the dowel 20.

Figure 7:
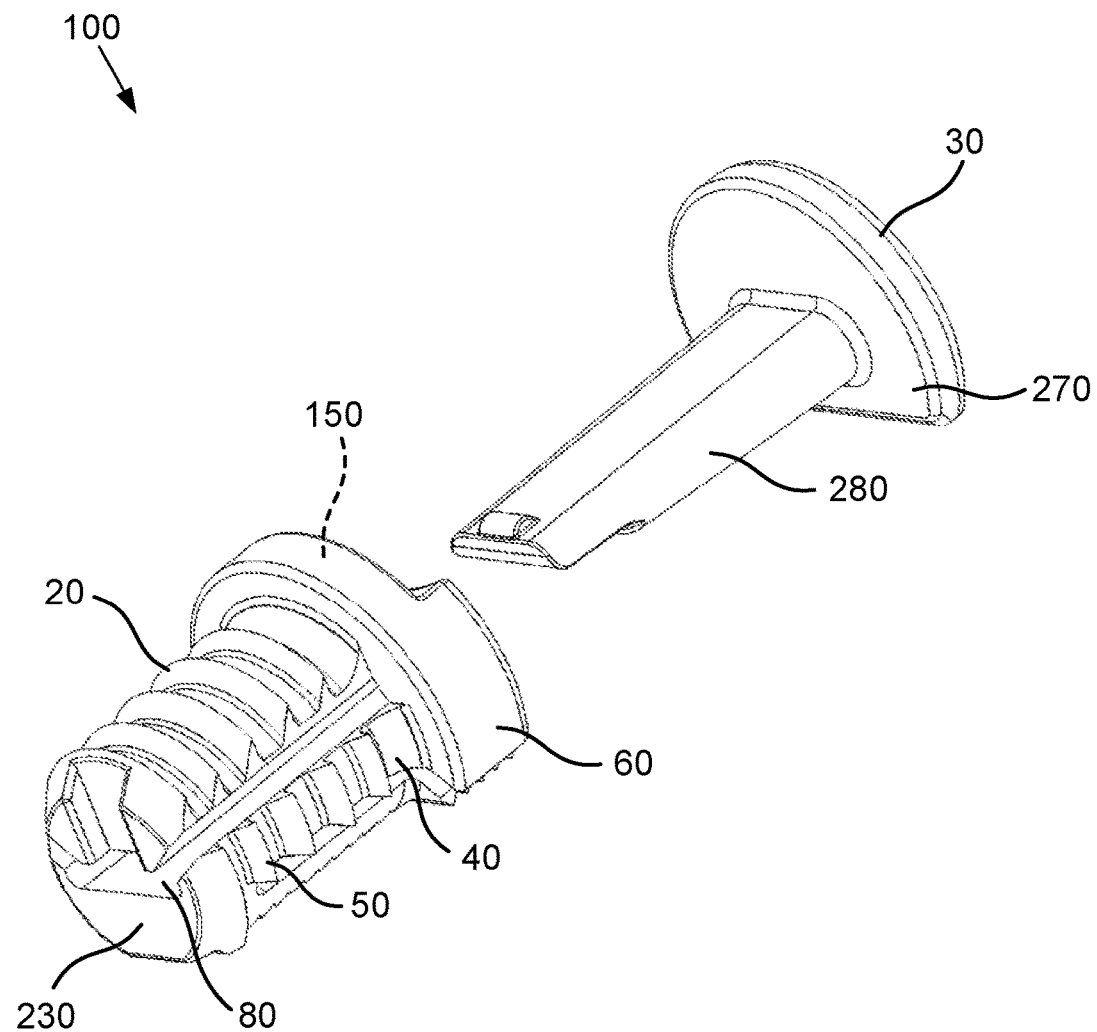
FIG. 7 shows perspective view of a fastening system comprising the fastening device shown in FIGS. 5-6, the fastening system being in a pre-assembled state.

A fastening system 100 is shown in FIG. 7, in an unassembled state. The system 100 is shown from a below view in relation to the top surface 150 of the upper part 40 of the dowel 20 and showing the bottom surface 230 of the lower part 50 of the dowel 20.

The pin 30 exhibits a wider upper part 270 and a more narrow lower part 280. The pin 30 is intended to be inserted into the through passage 80 of the dowel 20, with its lower part 280 inserted into the through passage 80, resting on the top surface 150 of the upper part 40 of the dowel 20.

Figure 8:
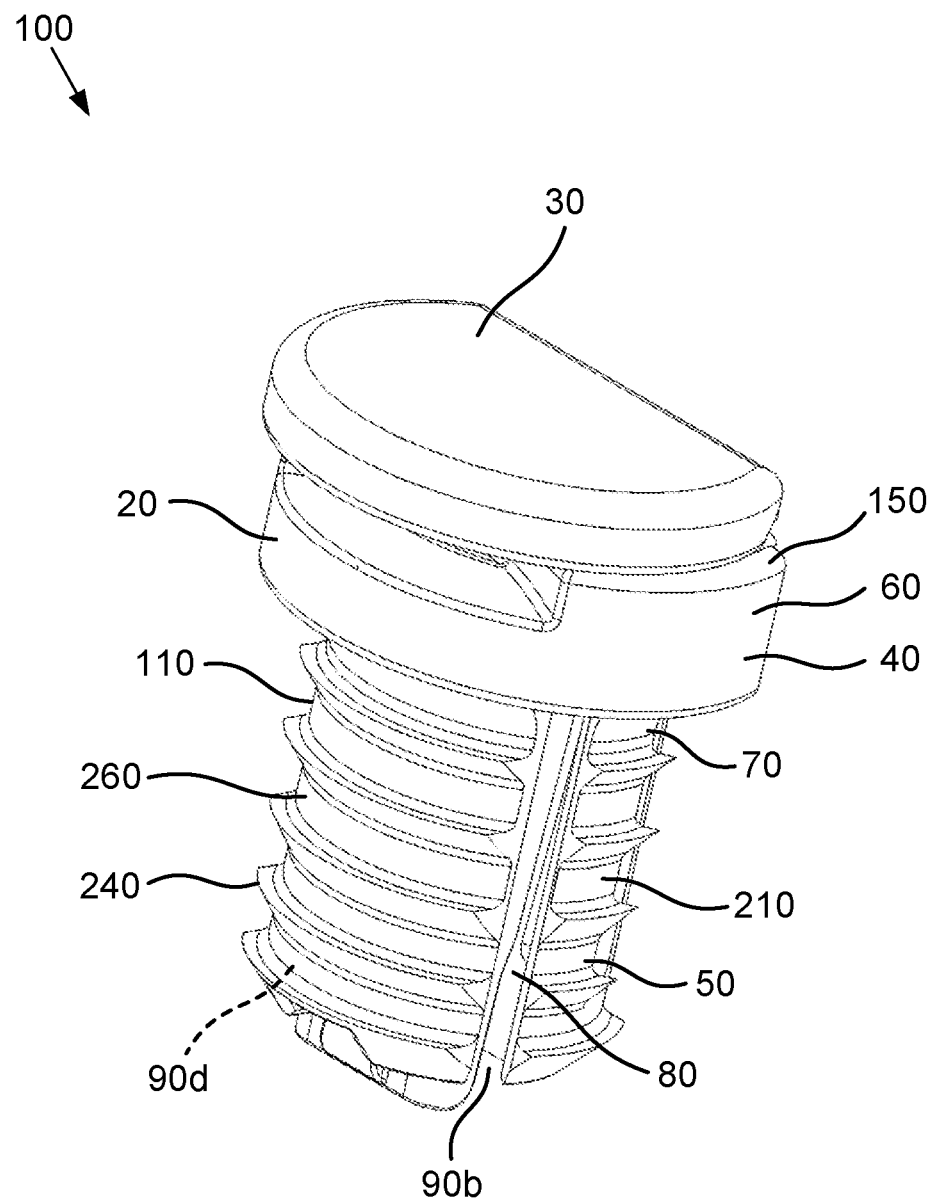
FIG. 8 shows perspective view of a fastening system comprising the fastening device shown in FIGS. 5-6, the fastening system being in an assembled state.

FIG. 8 shows a fastening system 100 in the assembled state, comprising a dowel 20 and a pin 30 inserted into the through passage 80 of the dowel 20. The dowel 20 is seen from the same perspective view as shown in FIG. 5. As can be seen in FIG. 8, when the pin 30 has been inserted into the dowel 20 it will force the section 260 of the dowel 20 between the second slit 90b and the fourth slit 90d to move in an outwards, radial direction thus expanding the dowel 20 in its lower part 50 to press against the walls of a borehole in which is inserted into, thus fixing the dowel to the furniture part comprising the borehole. The slits 90a-d will thus work as elements of taking up forces as well in the axial direction as in a direction lateral thereto, in the manner that when the pin 30 is inserted into the dowel 20, making a tongue or tongues of material extend from the dowel 20. Section 260 of the dowel 20 will form such a tongue, the other tongue being formed by the material between the slits 90a and 90c. When the pin 30 is fully inserted into the dowel 20 it will cause the dowel to expand in its upper part by means of the slits 90a and 90c arranged in the upper part 40 making the dowel 20 taking up forces in its upper part. The pin 30 will also expand the dowel in the lower part 50 of the dowel 20, by means of the slits 90 b and 90d arranged in the lower part 50, thus the dowel taking up forces also in the lower part 50.

Figure 9:
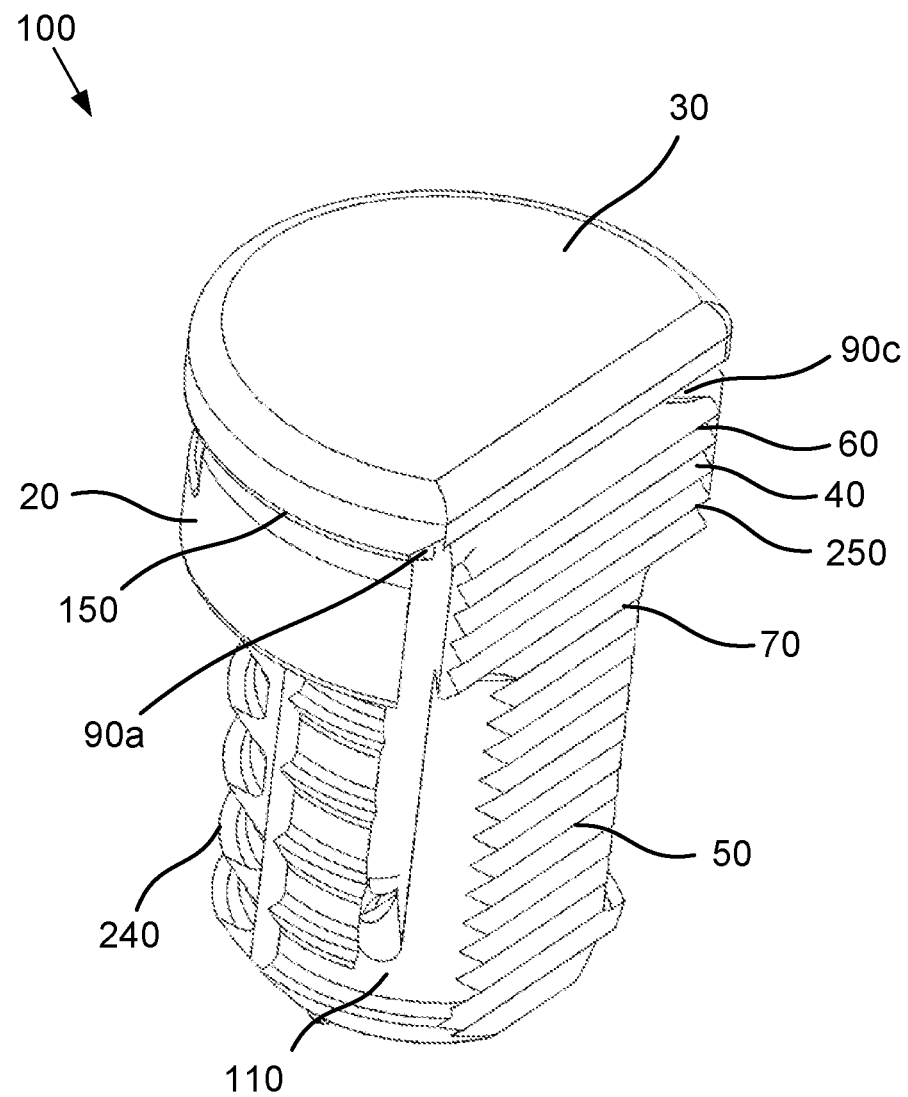
FIG. 9 shows another perspective view of a fastening system shown in FIG. 8.

FIG. 9 shows the fastening system 100 in its assembled stage shown from another perspective than in FIG. 8. The device 100 is seen from the side of the dowel 20 exhibiting the flat surface 220 of the circumferential peripheral surface.

The fastening system 100 shown in FIG. 9 is in an assembled state, shown from the same perspective as the dowel 20 is shown in FIG. 6. The fastening system 100 and the dowel 20 are shown from the side of the flat surface 220 of the circumferential peripheral surface 110 of the dowel 20.

Figure 10:
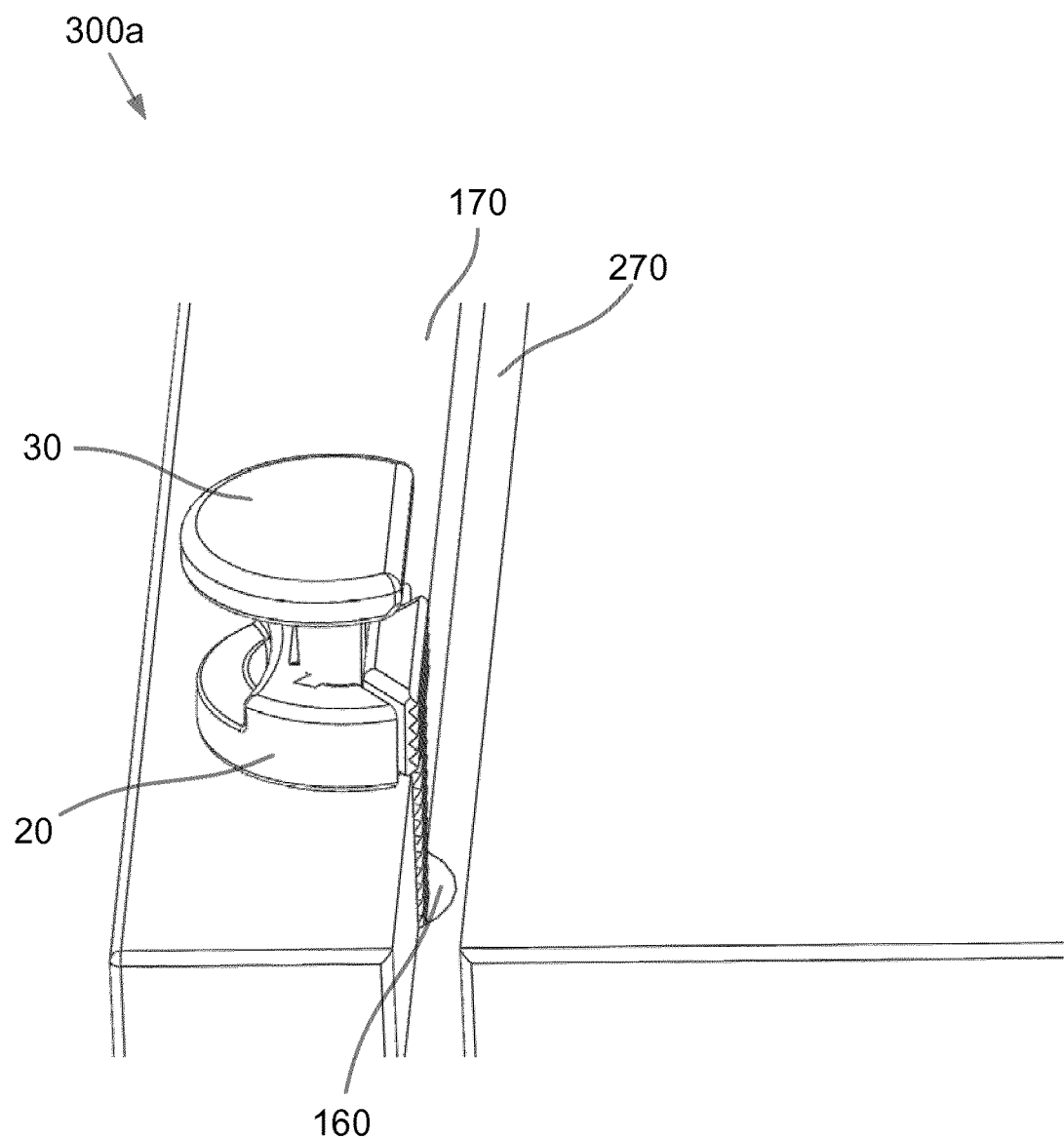
FIG. 10 shows parts of a furniture assembly comprising the fastening system shown in FIGS. 7-9, in semi-assembled state.

FIG. 10 shows parts of a furniture assembly 300a comprising the fastening system 100 shown in FIGS. 7-9, in semi-assembled state. This entails that the assembly 300a has started but is not finished. The assembly comprises a first furniture member 170 having a recess 270 for insertion of a second furniture member. The first furniture member 170 has a pre-drilled hole 160 into which the dowel 20 and the pin partially inserted into it are inserted. The dowel 20 and the pin 30 of the furniture assembly 300a may comprise all the details described above in connection to FIGS. 5-9.

Figure 11:
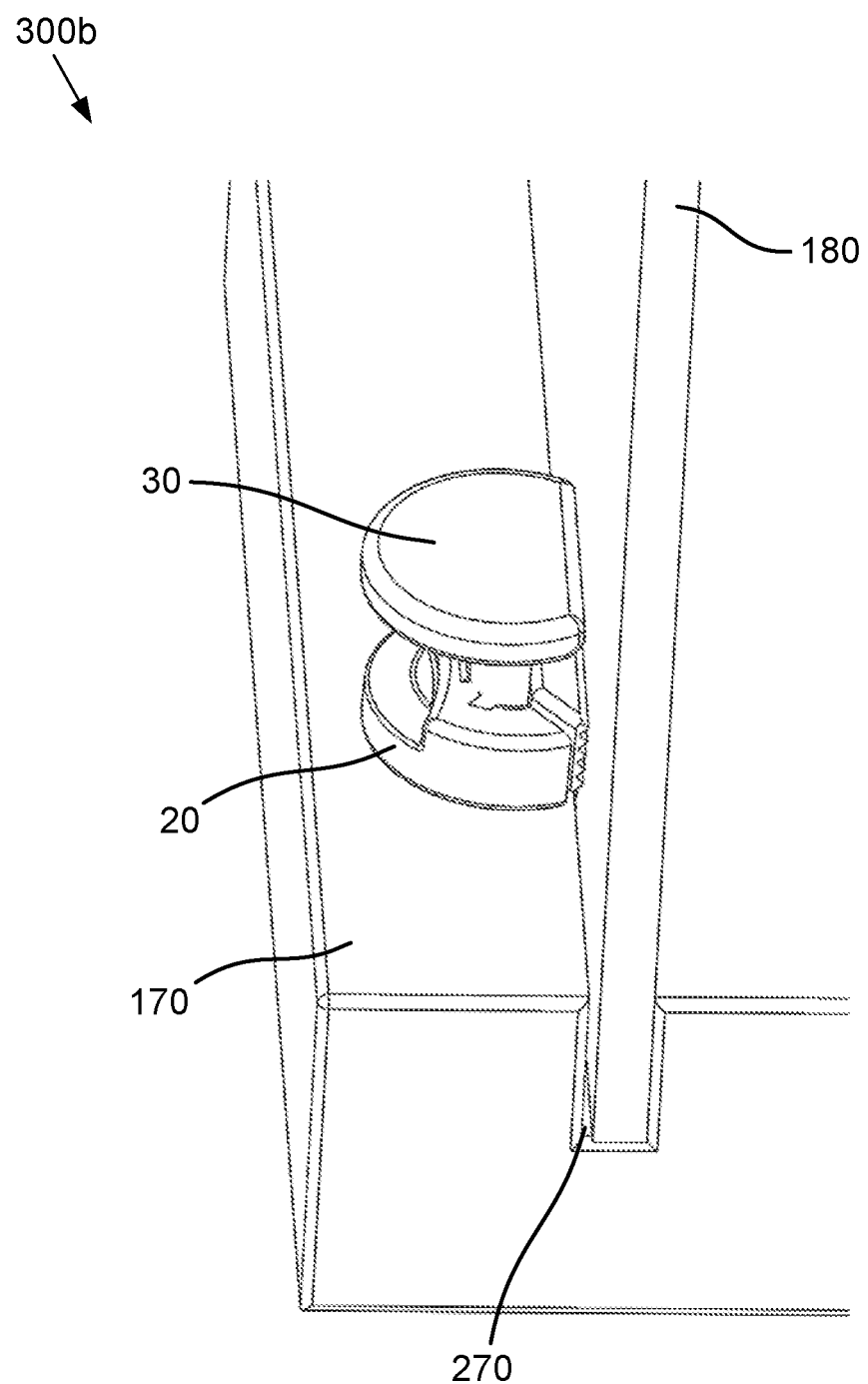
FIG. 11 shows a furniture assembly comprising the fastening system shown in FIGS. 7-9, in semi-assembled state.

FIG. 11 shows a furniture assembly 300b. In addition to the assembly 300a described in FIG. 10 the furniture assembly according to FIG. 11 also comprises a second furniture member 180 inserted into the recess 270 of the first furniture member 170. The furniture assembly 300b in FIG. 11 is in a semi-assembled state, the pin 30 not being fully inserted into the dowel 20.

Figure 12:
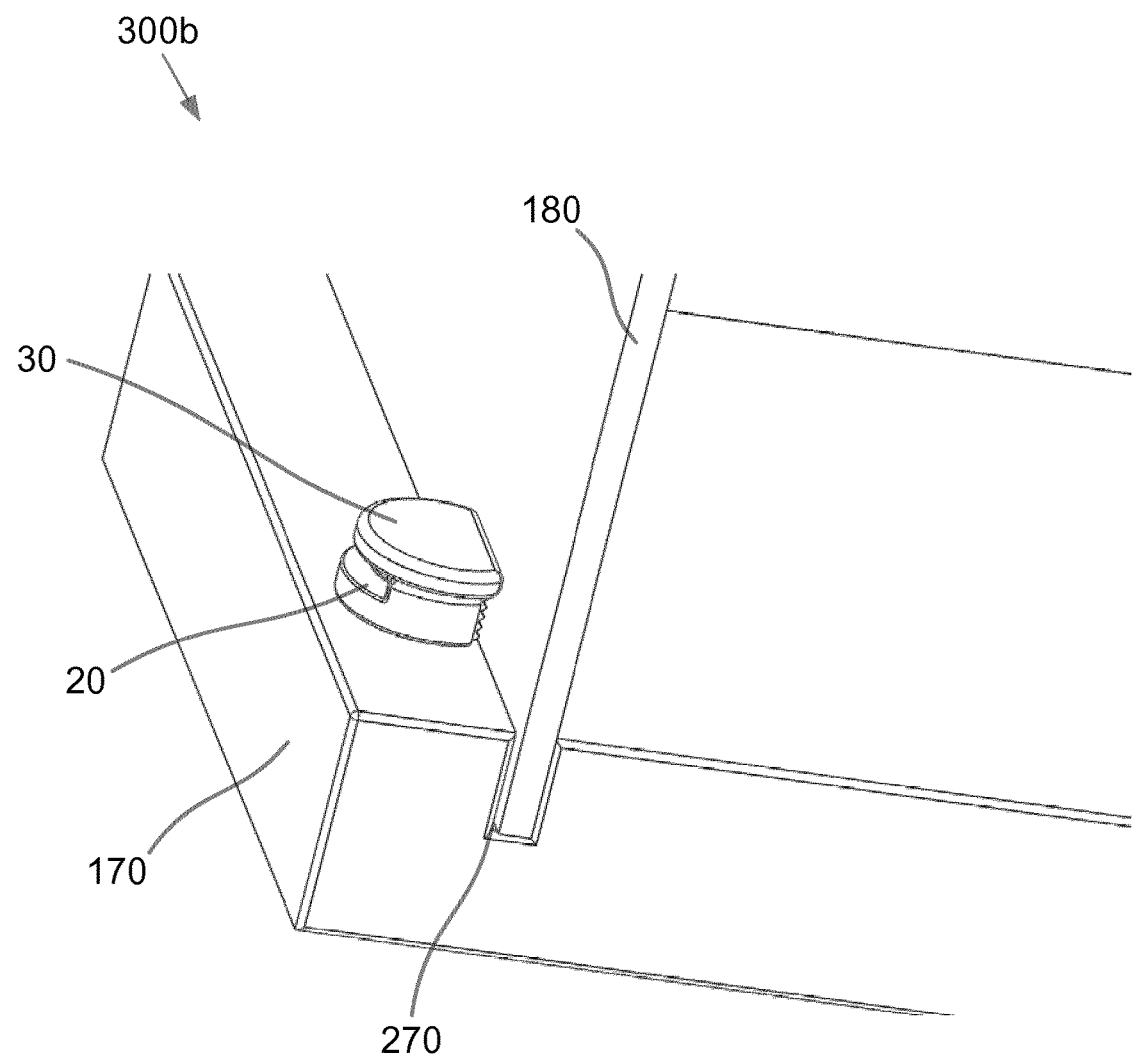
FIG. 12 shows a furniture assembly comprising the fastening system shown in FIGS. 7-9, in an assembled state.

FIG. 12 shows the furniture assembly 300b in an assembled state, when the pin 30 has been fully inserted into the dowel 20, the dowel 20 expanding from the insertion of the pin, in the parts where the slits 90a-90d are provided, thus clamping the dowel against the walls of the predrilled hole 160 in the first furniture part and expanding to clamp the second furniture part 180 against the first furniture part 170 thus assembling them in a detachable manner. As described earlier the dowel 20 will expand in its upper part 40 and also in its lower part 50. The manner in which the slits 90a-d are arranged will decide in which direction this will happen. The slits in the embodiment described are arranged in a manner so that the tongues in the upper part 40 and the lower part 50 will expand at an angle to each other. This will have the effect that the lower part 50 will clamp against the first furniture part 170 in the hole 160 and that the upper part 40 will clamp against the second furniture part 180, as the hole 160 is in connection with the recess 270, in which the furniture part is inserted. The first furniture part 170 is typically a part of furniture such as a cabinet and the second furniture part 180 is typically a back panel to be assembled to said furniture part. The furniture assembly 300b is easily detachable by pulling the pin 30 from the dowel 20.

It will be understood that various features of the device, system and assembly may be varied whilst still retaining their essential functionality within the realms of the invention. For instance, the protrusions, flanges and/or grooves of the dowel in the respective embodiment may vary in shape and/or size, as well as the dowel and pin and other features of the assembly. The fastening system according to the invention can be used to assemble any other suitably furniture parts, for instance for securing shelves in a furniture.

The invention claimed is:

1. A fastening device for assembling panels in furniture, the device having an axial extension along an axial direction and a lateral extension along a lateral direction, said device comprising:
   an upper part;
   a lower part;
   a circumferential extending peripheral surface at least partly comprising a curved surface constructed to fit in a bore hole of a first furniture part when assembled, and a flat surface constructed to fit and clamp against a flat surface of a second furniture part when the first furniture part and the second furniture part are assembled together; and an axially extending through passage for the insertion of a pin in the axial direction, wherein the upper part comprises a top surface and the lower part comprises a bottom surface, wherein the fastening device comprises a first slit arranged in the axial direction extending from the upper part of the fastening device and a second slit extending in the axial direction in the lower part of the fastening device, and wherein the first slit is arranged from the top surface of the upper part, extending in the axial direction, and the second slit is arranged from the bottom surface of the lower part extending in the axial direction, such that the upper part and the lower part are expandable upon insertion of the pin in the through passage.

2. A fastening device according to claim 1, wherein the fastening device comprises protrusions arranged on the peripheral surface of the fastening device.

3. A fastening device according to claim 2, wherein the protrusions are formed as circumferential flanges on the curved surface.

4. A fastening device according to claim 2, the upper part having a wider upper portion and a narrower lower portion, wherein the wider upper portion is arranged to lock the upper part to a surface of the furniture when the fastening device is inserted in a hole with narrower dimension than the wider upper portion.

5. A fastening device according to claim 2, wherein the protrusions are arranged to extend in the axial direction and also in a direction transversal thereto of the fastening device.

6. A fastening device according to claim 2, wherein the protrusions having an extension from the peripheral surface of about 0.1-3 mm.

7. A fastening device according to claim 1, wherein a further slit is arranged in from the bottom surface of the lower part, extending in the axial direction.

8. A fastening device according to claim 2, wherein the protrusions are formed as grooves on the flat surface.

9. A fastening device according to claim 1, wherein a further slit is arranged in from the top surface of the upper part, extending in the axial direction.

10. A fastening device according to claim 9, wherein the slits arranged in the upper part also extends into the lower part and that the slits arranged in the lower part also extends into the upper part.

11. A furniture assembly comprising a fastening system according to claim 10, and a first furniture part comprising a bore hole for receiving the curved surface, and a second furniture part having a flat surface for fitting and clamping to the flat surface of the fastening device.

12. A fastening system comprising a fastening device according to claim 1, further comprising the pin for insertion into the through passage of the fastening device.

13. A furniture assembly comprising a fastening system according to claim 12, wherein the first furniture part further comprises a recess allowing for insertion of the second furniture part therein.

\* \* \* \* \*